United States Patent
Sun et al.

(10) Patent No.: US 9,253,742 B1
(45) Date of Patent: Feb. 2, 2016

(54) FINE TIMING FOR HIGH THROUGHPUT PACKETS

(75) Inventors: Qinfang Sun, Santa Clara, CA (US); Kai Shi, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2478 days.

(21) Appl. No.: 11/947,749

(22) Filed: Nov. 29, 2007

(51) Int. Cl.
*H04J 3/06* (2006.01)
*H04W 56/00* (2009.01)
*H04L 7/04* (2006.01)

(52) U.S. Cl.
CPC ............... *H04W 56/00* (2013.01); *H04L 7/042* (2013.01)

(58) Field of Classification Search
USPC ......................................................... 370/350
See application file for complete search history.

(56) References Cited

U.S. PATENT DOCUMENTS

| | | | | |
|---|---|---|---|---|
| 6,611,537 B1* | 8/2003 | Edens et al. | ................... | 370/503 |
| 7,031,249 B2* | 4/2006 | Kowalski | ....................... | 370/203 |
| 7,450,489 B2* | 11/2008 | Sandhu | ......................... | 370/204 |
| 7,466,964 B2* | 12/2008 | Sondur | .......................... | 455/101 |
| 7,577,085 B1* | 8/2009 | Narasimhan | .................. | 370/264 |
| 7,577,438 B2* | 8/2009 | Sammour et al. | ............. | 455/450 |
| 7,590,189 B2* | 9/2009 | Hansen et al. | ................ | 375/295 |
| 7,599,332 B2* | 10/2009 | Zelst et al. | ..................... | 370/334 |
| 7,623,481 B2* | 11/2009 | Chen | .............................. | 370/322 |
| 7,643,453 B2* | 1/2010 | Webster et al. | ............... | 370/334 |
| 7,688,904 B2* | 3/2010 | Yonge et al. | ................... | 375/260 |
| 7,742,390 B2* | 6/2010 | Mujtaba | ......................... | 370/204 |
| 7,751,338 B2* | 7/2010 | Azenko et al. | ................ | 370/252 |
| 7,773,681 B2* | 8/2010 | Koo et al. | ...................... | 375/260 |
| 7,778,150 B2* | 8/2010 | Nakao | ............................ | 370/208 |
| 7,804,765 B2* | 9/2010 | Tzannes et al. | ................ | 370/210 |
| 7,808,960 B1* | 10/2010 | Chan et al. | ..................... | 370/338 |
| 7,809,020 B2* | 10/2010 | Douglas et al. | ............... | 370/474 |
| 7,813,374 B2* | 10/2010 | Moorti et al. | .................. | 370/466 |
| 7,835,476 B2* | 11/2010 | Aoki et al. | ..................... | 375/344 |
| 7,856,068 B1* | 12/2010 | Tung et al. | ..................... | 375/267 |
| 7,873,022 B2* | 1/2011 | Hansen et al. | ................. | 370/342 |
| 7,881,390 B2* | 2/2011 | Sadowsky et al. | ............. | 375/260 |
| 7,885,177 B2* | 2/2011 | Kopmeiners et al. | ......... | 370/208 |
| 7,903,749 B2* | 3/2011 | Moffatt | ......................... | 375/260 |
| 7,912,024 B2* | 3/2011 | Trachewsky | ................... | 370/338 |
| 7,916,803 B2* | 3/2011 | Gardner et al. | ............... | 375/267 |
| 7,920,599 B1* | 4/2011 | Subramanian et al. | ........ | 370/509 |
| 7,940,638 B2* | 5/2011 | Sandhu | ......................... | 370/204 |

(Continued)

OTHER PUBLICATIONS

Nanda, S. et al. "Adaptation Techniques in Wireless Packet Data Services," IEEE Communications Magazine, vol. 38, Issue 1, Jan. 2000, pp. 54-64.*

(Continued)

*Primary Examiner* — Melvin H Pollack
(74) *Attorney, Agent, or Firm* — Holland & Hart LLP

(57) ABSTRACT

Improved methods of decoding data symbols of a high throughput (HT) data field in a mixed mode packet are provided. In one embodiment, first and second data symbols of the HT data field can be decoded using timing information derived from a legacy header of the mixed mode packet. In another embodiment, the first data symbol of the HT data field can be decoded using timing information derived from a legacy header of the mixed mode packet, whereas the second data symbol of the HT data field can be decoded using approximately half of the tones of the HT long training field in the mixed mode packet. Subsequent data symbols of the HT data field can be decoded using all tones of the HT long training field in the received mixed mode packet.

2 Claims, 2 Drawing Sheets

(56) References Cited

U.S. PATENT DOCUMENTS

| | | | | |
|---|---|---|---|---|
| 7,957,474 | B2* | 6/2011 | Waters et al. | 375/260 |
| 7,974,591 | B2* | 7/2011 | Trachewsky et al. | 455/104 |
| 7,978,729 | B2* | 7/2011 | Moorti et al. | 370/468 |
| 2007/0153830 | A1* | 7/2007 | Xhafa et al. | 370/470 |
| 2007/0153930 | A1* | 7/2007 | Reid | 375/260 |
| 2007/0189263 | A1* | 8/2007 | Izumi et al. | 370/350 |
| 2007/0207823 | A1* | 9/2007 | van Nee et al. | 455/509 |
| 2007/0248063 | A1* | 10/2007 | Habetha | 370/338 |
| 2007/0248104 | A1* | 10/2007 | Rudolf et al. | 370/400 |
| 2007/0253499 | A1* | 11/2007 | Waters et al. | 375/260 |
| 2007/0258384 | A1* | 11/2007 | Sammour et al. | 370/252 |
| 2007/0280180 | A1* | 12/2007 | Dalmases et al. | 370/338 |
| 2008/0013496 | A1* | 1/2008 | Dalmases et al. | 370/336 |
| 2008/0045153 | A1* | 2/2008 | Surineni et al. | 455/63.1 |
| 2008/0101482 | A1* | 5/2008 | Labbe et al. | 375/260 |
| 2008/0212696 | A1* | 9/2008 | Takahashi et al. | 375/260 |
| 2008/0316981 | A1* | 12/2008 | Trainin | 370/338 |
| 2009/0122882 | A1* | 5/2009 | Mujtaba | 375/260 |
| 2009/0185632 | A1* | 7/2009 | Cai et al. | 375/260 |
| 2009/0310702 | A1* | 12/2009 | Lewis | 375/267 |
| 2010/0014504 | A1* | 1/2010 | Sun et al. | 370/345 |
| 2010/0061402 | A1* | 3/2010 | van Zelst et al. | 370/474 |
| 2010/0118206 | A1* | 5/2010 | Gao et al. | 348/723 |
| 2010/0189167 | A1* | 7/2010 | Pare et al. | 375/219 |
| 2011/0116565 | A1* | 5/2011 | Mujtaba | 375/260 |

OTHER PUBLICATIONS

Nanda, S. et al. "A High Performance MIMO OFDM Wireless LAN," IEEE Communications Magazine, vol. 43, Issue 2, Feb. 2005, pp. 101-109.*

Larola, R. et al. "Designing a Mobile Broadband Wireless Access Network," IEEE Signal Processing Magazine, vol. 21, Issue 5, Sep. 2004, pp. 20-28.*

Dimakis, A.G. et al. "Ubiquitous Access to Distributed Data in Large-Scale Sensor Networks through Decentralized Erasure Codes," Fourth Intl. Symposium on Information Processing in Sensor Networks, Apr. 2005, pp. 111-117.*

Ye, Wei et al. "Medium Access Control with Coordinated Adaptive Sleeping for Wireless Sensor Networks," IEEE/ACM Transactions on Networking (TON), vol. 12, Issue 3, Jun. 2004, pp. 493-506.*

Li, Ye et al. "Transmitter Diversity for OFDM Systems and its Impact on High-Rate Data Wireless Networks," IEEE Journal on Selected Areas in Communications, vol. 17, Issue 7, Aug. 2002, pp. 1233-1243.*

Wiegandt, D.A. et al. "High-Throughput, High-Performance OFDM via Pseudo-Orthoginal Carrier Interferometry Spreading Codes," IEEE Transactions on Communications, vol. 51, Issue 7, Jul. 2003, pp. 1123-1134.* van Nee, Richard. "The 802.11n MIMO-OFDM Standard for Wireless LAN and Beyond," Wireless Personal Communications, vol. 37, Nos. 3-4, SpringerLink, Oct. 2007, pp. 445-453.*

Wang, Dong and Zhang, Jinyun. "Timing Synchronization for MIMO-OFDM WLAN Systems," IEEE Wireless Communications and Networking Conference, Jun. 2007, pp. 1177-1182.*

Cerato, Barbara et al. "Hardware Architecture for Matrix Factorization in MIMO Receivers," Proceedings of the 17th ACM Great Lakes Symposium on VLSI (GLSVLSI), 2007.*

Peng, Fei and Zhang, Jinyun. "On Residual Carrier Frequency Offset Mitigation for 802.11n," IEEE International Conference on Acoustics, Speech and Signal Processing, Jun. 2007, pp. III-257-III-260.*

Van Nee, Richard et al. "The 802.11n MIMO-OFDM Standard for Wireless LAN and Beyond," Wireless Personal Communications, vol. 37, 2006, pp. 445-453.*

Zheng, Feng and Nelson, John. "Adaptive Design for the Packet Length of IEEE 802.11n Networks," IEEE International Conference on Communications, May 2008, pp. 2490-2495.*

"802.11n Primer," Whitepaper, AirMagnet, Aug. 2008, pp. 1-15.*

"Wi-Fi Certified 802.11n Draft 2.0: Longer-Range, Faster-Throughput, Multimedia-Grade Wi-Fi Networks," Wi-Fi Alliance, 2007, pp. 1-18.*

* cited by examiner

200

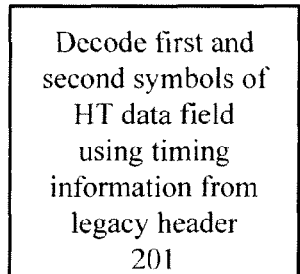

Decode first and second symbols of HT data field using timing information from legacy header
201

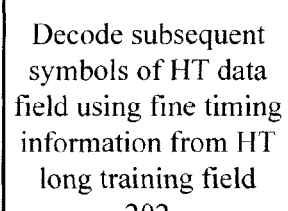

Decode subsequent symbols of HT data field using fine timing information from HT long training field
202

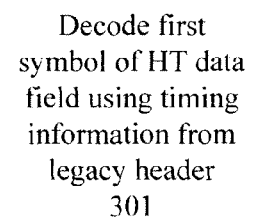

Decode first symbol of HT data field using timing information from legacy header
301

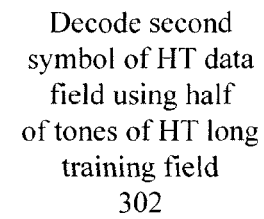

Decode second symbol of HT data field using half of tones of HT long training field
302

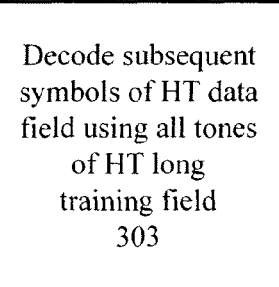

Decode subsequent symbols of HT data field using all tones of HT long training field
303

FIG. 3

FINE TIMING FOR HIGH THROUGHPUT PACKETS

BACKGROUND OF THE INVENTION

1. Field of the Invention

The present invention relates to wireless networks, and in particular to the decoding of the first high throughput (HT) symbol of the HT data field.

2. Related Art

The IEEE 802.11-2007 is a set of standards relating to wireless local area networks (WLAN). The legacy standards, e.g. 802.11a and 802.11g, have data rates that are relatively low. For example, both 802.11a (released 1999) and 802.11g (released 2003) have a data rate of 54 Mbit/s. In contrast, one of the most recent standards, 802.11n (projected release 2008), has a data rate of 300 Mbit/s. Thus, 802.11n is characterized as a high throughput protocol.

An 802.11 access point (AP) can operate in one of three modes: the legacy, mixed, or Greenfield mode. In the legacy mode, the AP can use one of the legacy protocols, e.g. 802.11a or 802.11g. In the mixed mode, the AP can use one of the legacy protocols or 802.11n. In the Greenfield mode, the AP can only use 802.11n (wherein "Greenfield" refers to a project that lacks any constraint imposed by prior work).

FIG. 1 illustrates an exemplary mixed mode packet format 100 that can be used in accordance with the 802.11n standard. As shown, mixed mode packet format 100 includes a legacy header 110, a high throughput (HT) header 111, and an HT data field 109. Legacy header 110 includes a legacy short training field 101, first and second legacy long training fields 102 and 101, and a legacy signal field 104. HT header 111 includes first and second HT signal fields 105 and 106, an HT short training field 107, and an HT long training field 108.

As known by those skilled in the art of wireless communication, fine timing (which determines an offset of the receiver) can be estimated from the slope of a frequency domain channel response. In a conventional legacy packet, which includes legacy header 110 followed by a legacy data field, legacy long training fields 102 and 103 can be used to consecutively better estimate the fine timing.

Notably, an HT receiver may ignore legacy header 110, thereby relying solely on HT header 111 for fine timing. However, HT header only includes one HT long training field 108. Unfortunately, by the time fine timing is obtained from this sole field, the first and second data symbols of HT data field 109 are already being processed for decoding. This fine timing is available for the third data symbol of HT data field 109.

To resolve this processing latency, the symbols of the data field could be stored in memory and then accessed for processing when the fine timing information is available. Unfortunately, this solution incurs undesirable additional hardware and time latency costs. Note that 802.11n requires that decoding of the packet must be complete by 16 microseconds after the end of the packet. Unfortunately, the additional time latency associated with data symbol storage and access could violate this requirement.

Therefore, a need arises for a technique to provide improved decoding for the first data symbol of the HT data field.

SUMMARY OF THE INVENTION

Improved methods of decoding data symbols of a high throughput (HT) data field in a received mixed mode packet are provided. In one embodiment, first and second data symbols of the HT data field can be decoded using timing information derived from the legacy header of the mixed mode packet. Subsequent data symbols (i.e. third, fourth, etc.) of the HT data field can be decoded using fine timing information derived from the HT long training field in the received mixed mode packet.

In another embodiment, the first data symbol of the HT data field can be decoded using timing information derived from the legacy header of the mixed mode packet. The second data symbol of the HT data field can be decoded using approximately half of the tones of an HT long training field in the received mixed mode packet. Subsequent data symbols (i.e. third, fourth, etc.) of the HT data field can be decoded using all the tones of the HT long training field in the received mixed mode packet.

BRIEF DESCRIPTION OF THE FIGURES

FIG. 2 illustrates a first technique for providing improved decoding for the first few data symbols of the HT data field in a received mixed mode packet.

FIG. 3 illustrates a second technique for providing improved decoding for the first few data symbols of the HT data field in a received mixed mode packet.

DETAILED DESCRIPTION OF THE FIGURES

Figure 1:
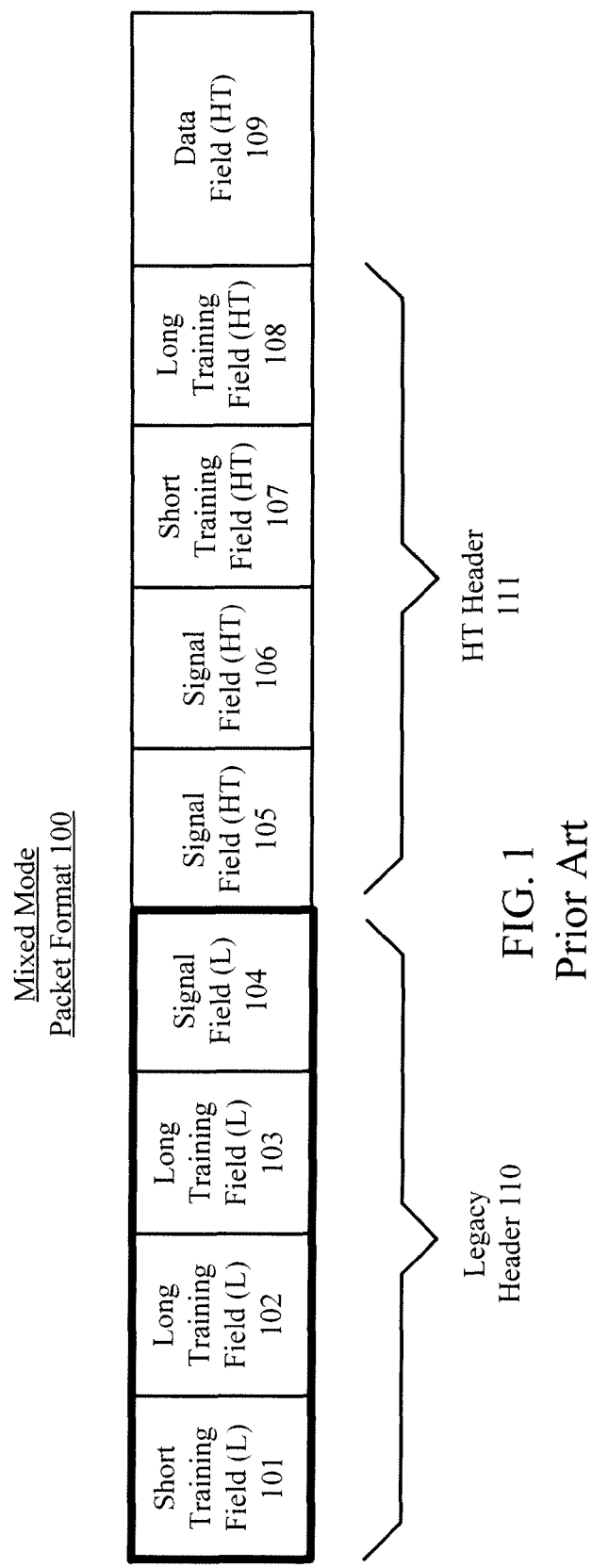
FIG. 1 illustrates an exemplary mixed mode packet format that can be used in accordance with 802.11n.

An HT receiver typically ignores the legacy header in a mixed mode packet. Therefore, the HT receiver may rely only on the HT header of the mixed mode packet for fine timing. However, the HT header includes only one HT long training field. Unfortunately, by the time fine timing is obtained from this sole field, the first and second data symbols of the HT data field are already being processed for decoding. Fortunately, this fine timing is available for the decoding of the third data symbol of the HT data field.

FIG. 2 illustrates one technique 200 to provide improved data decoding with coarse timing information for the first two data symbols of the HT data field. In technique 200, the first and second data symbols of the HT data field can be decoded using the timing information derived from the legacy header of the mixed mode packet (e.g. the two long training fields) in step 201. In step 202, subsequent symbols of the HT data field (i.e. third, fourth, etc.) can be decoded using the fine timing information derived from the HT long training field in the mode packet (i.e. the optimized, fine timing information).

FIG. 3 illustrates another technique 300 to provide improved data decoding with coarse timing information for the first two data symbols of the HT data field. In step 301, the first data symbol of the HT data field can be decoded using timing information derived from the legacy header of the mixed mode packet. In step 302, the second data symbol of the HT data field can be decoded using half of the tones of the HT long training field in the received packet. The use of half of the tones can advantageously speed up fine timing (and channel smoothing), albeit with some attendant decrease in accuracy compared to using all of the tones. In step 303, subsequent symbols of the HT data field (i.e. third, fourth, etc.) can be decoded using the fine timing information derived from all tones of the HT long training field in the received mixed mode packet.

Although illustrative embodiments have been described in detail herein with reference to the accompanying figures, it is to be understood that the invention is not limited to those precise embodiment. They are not intended to be exhaustive or to limit the invention to the precise forms disclosed. As such, many modifications and variations will be apparent to practitioners skilled in this art. For example, although FIG. 3 teaches using half of the tones, other embodiments may use more or less tones (e.g. +/−10%). Accordingly, it is intended that the scope of the invention be defined by the following claims and their equivalents.

The invention claimed is:

1. A method of decoding data symbols of a high throughput (HT) data field in a mixed mode packet, the method comprising:
   decoding a first data symbol and a second data symbol of the HT data field using timing information derived solely from a legacy header of the mixed mode packet; and
   decoding subsequent data symbols of the HT data field using fine timing information derived from an HT long training field in the mixed mode packet.

2. A method of decoding data symbols of a high throughput (HT) data field in a received mixed mode packet, the method comprising:
   decoding a first data symbol of the HT data field using timing information derived from a legacy header of the mixed mode packet;
   decoding a second data symbol of the HT data field using approximately half of a plurality of tones of an HT long training field in the mixed mode packet; and
   decoding subsequent data symbols of the HT data field using all of the plurality of tones of the HT long training field in the received mixed mode packet.

* * * * *